United States Patent [19]

Keske et al.

[11] 4,323,493
[45] Apr. 6, 1982

[54] INJECTION MOLDABLE AMIDE-IMIDE POLYMERS CONTANING DIVALENT ALIPHATIC RADICALS DERIVED FROM ALIPHATIC DIAMINES

[75] Inventors: Robert G. Keske; James R. Stephens, Naperville, both of Ill.

[73] Assignee: Standard Oil Company (Indiana), Chicago, Ill.

[21] Appl. No.: 245,641

[22] PCT Filed: Jan. 7, 1981

[86] PCT No.: PCT/US81/00074

§ 371 Date: Jan. 7, 1981

§ 102(e) Date: Jan. 7, 1981

Related U.S. Application Data

[63] Continuation-in-part of Ser. No. 112,650, Jan. 16, 1980, abandoned.

[51] Int. Cl.$^3$ ............................................. C08G 69/26
[52] U.S. Cl. ..................................... 524/451; 264/325; 264/331.11; 528/172; 528/188; 528/350; 524/600
[58] Field of Search ....................... 528/350, 172, 188; 260/37 N

[56] References Cited

U.S. PATENT DOCUMENTS

| 2,421,024 | 5/1947 | Frosch | 528/350 |
| 3,654,227 | 4/1972 | Dine-Hart | 528/350 |
| 3,661,863 | 5/1972 | Campbell | 528/350 |
| 3,817,942 | 6/1974 | Kovacs et al. | 528/350 |
| 3,862,092 | 1/1975 | Flowers et al. | 528/350 |
| 4,066,631 | 1/1977 | Dimmig | 528/350 |

FOREIGN PATENT DOCUMENTS 570858  7/1945  United Kingdom ............... 528/350

Primary Examiner—Howard E. Schain
Attorney, Agent, or Firm—Gunar J. Blumberg; William T. McClain; William H. Magidson

[57] ABSTRACT

A novel process for the preparation of injection moldable polymers prepared from diacylated aliphatic diamines, tricarboxylic anhydride compounds and aliphatic primary diamines. These polymers are useful for the preparation of injection molded articles and fibers. A process for enhancing the crystallization of these polymers by the addition of nucleating agents is also disclosed.

12 Claims, No Drawings

INJECTION MOLDABLE AMIDE-IMIDE POLYMERS CONTANING DIVALENT ALIPHATIC RADICALS DERIVED FROM ALIPHATIC DIAMINES

This application is a continuation-in-part of Application Ser. No. 112,650, filed Jan. 16, 1980 and now abandoned.

BACKGROUND OF THE INVENTION

1. Field of the Invention

The field of the invention relates to polyamideimide polymers prepared from N,N'-diacylated aliphatic, cycloaliphatic or araliphatic diamines, tricarboxylic acid anhydride compounds and aliphatic, cycloaliphatic or araliphatic diamines and to molded objects and fibers prepared from these polymers.

2. Background

Injection moldable amide-imide polymers have been prepared utilizing aromatic diamines. This is disclosed in U.S. Pat. Nos. 4,016,140 (1977) and 3,573,260 (1971). The prior art does not disclose that injection molded, melt prepared, crystalline objects can be prepared from aliphatic diamine moieties. Except for the aforerecited patents, the prior art discloses that the major application of amide-imide polymers has been as wire enamels. This is illustrated in U.S. Pat. Nos. 3,817,942 (1974), 3,661,832 (1972), 3,454,890 (1970) and 3,347,878 (1967). British Specification No. 570,858 (1945) discloses the general state of the art.

The general object of this invention is to provide melt prepared, ordered, linear, crystalline injection moldable polymers containing aliphatic, cycloaliphatic and araliphatic moieties. A more specific object of this invention is to provide polyamide-imide polymers containing aliphatic amine moieties which polymers are suitable for use as an engineering plastic particularly for use in injection molding and the manufacture of fibers. Another object is to provide suitable nucleating agents for the polyamide-imide polymers to enhance the crystallization rate of the ordered polyamide-imide polymers.

We have now found that injection moldable polyamide-imide polymers can be produced by reacting diacylated aliphatic, cycloaliphatic and araliphatic diamines with tricarboxylic acid anhydride compounds and aliphatic diamines, cycloaliphatic and araliphatic diamines in a molar ratio of about 1.2:2:0.8 to 0.8:2:1.2, advantageously in a molar ratio of about 0.9:2:1.1 to about 1.1:2:0.9 at a temperature of about 100° to 700° F. to obtain an injection moldable amide-imide polymer. The order for the addition of the reactants is not critical and all reactants can be added simultaneously or in any order desired. It has been discovered that the acylated diamine reacts preferentially with the acid groups of the tricarboxylic acid anhydride compound and that all the reatants, acylated aliphatic diamine, tricarboxylic anhydride compound and aliphatic diamine can be combined in the presence of the organic polar solvent such as dimethyl acetamide. Furthermore, acylated diamine need not be isolated or purified prior to its combination with the tricarboxylic acid anhydride compound and the aliphatic diamine.

The injection moldable linear polyamide-imide polymer of this invention comprises the following repeating structural unit

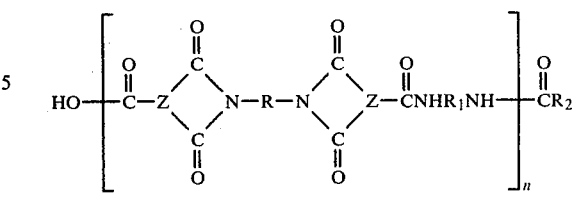

In the foregoing structural unit Z is a trivalent aromatic radical. Z may be a trivalent radical of benzene, naphthalene, biphenyl, diphenyl ether, diphenyl sulfide, diphenyl sulfone, ditolyl ether, and the like.

Useful aromatic tricarboxylic acid anhydrides which contribute the trivalent radical moiety of Z include those compounds containing at least one pair of carboxyl groups in the ortho position with respect to each other or otherwise situated in a fashion which permits the formation of an anhydride structure, one other carboxyl group and from 9 to 21 carbon atoms. Within these limits, these compounds may contain one or more benzenoid rings such as, for instance, trimetallic anhydride and its isomers and multiring compounds such as the 1,8-anhydride of 1,3,8-tricarboxylnaphthalene. Usually these compounds contain up to three benzenoid rings.

The aromatic tricarboxylic acid anhydride used in the novel process to form the polyamide-imide polymers of this invention is of the formula:

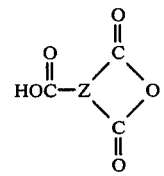

where Z is a trivalent aromatic radical defined as set forth hereinabove. The following aromatic tricarboxylic anhydrides are preferred: trimellitic acid anhydride; 2,3,6-naphthalene tricarboxylic anhydride; 1,5,6-naphthalene tricarboxylic anhydride, and the like; 2,6-dichloronaphthalene-4,5,7-tricarboxylic anhydride, and the like. One of the preferred aromatic tricarboxylic anhydrides is trimellitic anhydride since this compound is readily available and forms polymers having excellent physical properties of tensile strength and elongation and is resistant to high temperatures.

R and $R_1$ may be the same or be different and are divalent araliphatic, aliphatic, or cycloaliphatic radicals of from 2 to 18 carbon atoms in which carbon atoms attached to N are aliphatic carbon atoms and $R_2$ is an aliphatic radical of from 1 to 5 carbon atoms. R and $R_1$ are derived from aliphatic diamines such as ethylenediamine, tetramethylenediamine, hexamethylenediamine, octamethylenediamine, nonamethylenediamine, decamethylenediamine, dodecamethylenediamine, 4,4'-diamino(dicyclohexylmethane), xylylenediamine. The preferred diamines include 1,6-diaminohexane, 1,2-diaminoethane, 1,8-diaminooctane, 1,12-diaminododecane, 1,10-diaminodecane, 1,4-diaminobutane.

Low molecular weight polyamide-imides from aliphatic diamines have been prepared by a variety of methods by the prior art. However, none of these methods have produced polymers which are useful for injection molding applications. Applicants have discovered a process for the preparation of ordered linear crystalline injection moldable amide-imide polymers, which process comprises reacting fully acylated aliphatic, cycloaliphatic or araliphatic diamines with tricarboxylic acid anhydride compounds and aliphatic, cycloaliphatic or araliphatic diamines in a molar ratio of about 1:2:1 at a temperature of about 100° to 700° F., preferably 150° to 650° F. Optionally the polymer may be further polymerized under solid state polymerization conditions at a temperature of about 400° to 550° F. The resulting high molecular weight injection moldable polymer obtained has an inherent viscosity in the range of 0.4 to 3.0. For the purpose of this invention inherent viscosity is measured at 25° C. and 0.5% w/v in 60/40 w/w/ phenol/1,1,2,2-tetrachloroethane. The term "solid state polymerization" refers to chain extension of polymer particles under conditions where the polymer particles retain their solid form and do not become a fluid mass. These polymers have excellent mechanical and thermal properties and can be readily injection molded. This injection moldability of these polymers can be partially attributed to the fact that these polymers are linear and are not cross linked. Injection molding of the polymers is accomplished by injecting the polymer into the mold maintained at a temperature of about 100°–500° F. In this process a 0.1–2.0 minutes cycle is used with a barrel temperature of about 400° F. to 700° F. The injection molding conditions are given in Table I.

TABLE I

| | |
|---|---|
| Mold Temperature | 100–500° F. |
| Injection Pressure | 2,000–20,000 psi and held for 0.2–15.0 seconds |
| Back Pressure | 0–400 psi |
| Cycle Time | 5–120 seconds |
| Extruder: | |
| Nozzle Temperature | 400° F. to 700 ° F. |
| Barrel Temperature | 400° F. to 700° F. |
| Screw: | |
| 10–200 revolutions/minute | |

These injection molding polymers can also be filled from about 20 to 60 weight percent with glass fibers, glass beads, mineral fillers, or mixtures thereof. Suitably, the aforementioned molding compositions may contain from about 30 to 50 weight percent of glass fibers, glass beads, mineral fillers, or mixtures thereof.

The mechanical properties of the polymers prepared in the Examples are given in Tables III through VI and Table VIII.

The solid state polymerization is carried out below the melting point of the polymer and can be conducted in several ways. However, all the techniques require heating the ground or pelletized polymer below the polymer melting point, generally of about 400° to 550° F. while either sparging with an inert gas, such as nitrogen, or operating under vacuum. In applicants' process the acylated diamine need not be isolated or purified prior to its further reaction with the tricarboxylic acid anhydride compound and the aliphatic diamine. Therefore, one can react two moles of acetic anhydride or propionic anhydride and one mole of the aliphatic diamine and use the resulting diacylated diamine solution in acetic acid or propionic acid to react the two moles of tricarboxylic anhydride compound and one mole of diamine and heat the mixture to complete imidization without purification or isolation. Diacylating agents for the diamines include acetic anhydride or acid, or propionic acid or anhydride or any aliphatic acid or anhydride containing from 2 to 8 carbon atoms per acid, preferably 2 to 4 carbon atoms per acid or 4 to 16 carbon atoms per anhydride, preferably 4 to 8 carbon atoms. Formic acid cannot be used as an acylating agent in this process. Usually, high molecular weight crystalline polyamide-imide polymers result.

It should be noted that prior to full imidization in our process there is an intermediate polyamic acid formed of the following structure:

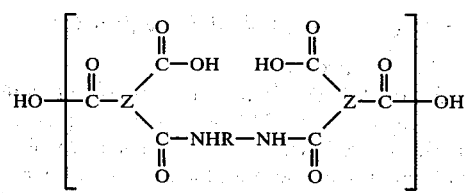

which upon further heat treatment converts to

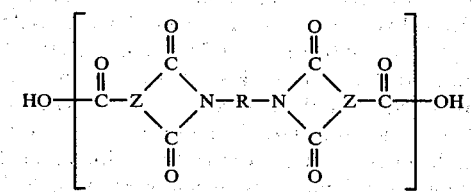

and then to the injection moldable final polyamide-imide polymer disclosed hereinbefore. The values for Z and R are the same as used throughout this specification.

It has been found that to facilitate the injection moldability of the polymer produced according to applicants' novel process, nucleating agents may be employed. Without using a nucleating agent, crystalline, fiberglass reinforced samples can be obtained by injection molding if the mold temperature is maintained at a level of about 300° to 400° F. and the mold remaines closed during the long crystallization part of the cycle. However, the rate of crystallization of the polymer may be so slow that the cycle time on occasion could be uneconomical. To obviate this problem, applicants have discovered effective nucleating agents. The more effective of these agents has been talc when used in about 0.01 to 10.0 weight % of the total polymer, preferably about 0.05 to 4.0 weight %. For example, it has been found that fumed silicas and zinc oxide show no effect and are useless as nucleating agents. When talc was utilized, the crystallization temperature of the polymer increased from 199° to 223° C. The use of talc as a nucleating agent lowers the induction period for the onset of crystallization of about 10 fold and also lowers the half-life from about 90 seconds to 30 seconds at 200° C.

The following examples illustrate the preferred embodiments of this invention. It will be understood that these examples are for illustrative purposes only and do not purport to be wholly definitive with respect to the conditions or scope of the invention.

Examples 1 through 9 illustrate our invention and demonstrate that as the ratio of diacetyldiamine: trimellitic anhydride: diamine approach 1:2:1, the rates of crystallization of the polymer and the heat deflection temperatures at 264 psi of the molded, glass reinforced specimens, attain their highest values. In general, as the rate of crystallization becomes faster, the injection molding cycle will also become faster and more economical. Furthermore, as the heat deflection temperature of a molded polymer increases, the maximum temperature at which the polymer can be used will also increase. Both of these valuable features are necessary to make useful injection moldable objects utilizing less expensive acylated and unacylated aliphatic diamines. The other examples illustrate the acetylation of the diamine, further polymer preparation, solid state polymerization, and use of nucleating agents.

EXAMPLE 1

1:2:1 Polymer Preparation

Trimellitic anhydride (TMA) (576 g, 3 moles) was placed in a 3 liter 3 necked flask equipped with a metal stirrer, addition funnel with nitrogen inlet, and distillation takeoff and condenser. The system was flushed with $N_2$ at 375 cc/min. Dimethyl acetamide (DMAC) (600 ml) was added and the mixture stirred for five minutes. A warm solution of 174 g (1.5 mole) of 1,6-hexanediamine (HMDA) in 176 g of DMAC was added to the stirred mixture over six minutes. The temperature of the bottom half of the spherical heating mantle surrounding the flask was then set at 620° F. Into a separate one liter 3 necked flask equipped with magnetic stirrer, addition funnel and reflux condenser was placed 174 g (1.5 mole) of molten HMDA. To this was slowly added 306 g (3 moles) of acetic anhydride to prepare the diacetyldiamine. After approximately 250 ml had distilled from the 3 liter 3 necked flask, the diacetyldiamine solution was rapidly added. The Variac controlling the top half of the spherical heating mantle surrounding the 3 liter flask was turned on and set at 20. After a total of approximately 1,100 ml of liquid had distilled under nitrogen sweep the polymer was quite fluid. Heating and stirring were continued for 15 min. under 150 torr absolute and for 48 min. under high vacuum (0.70 torr). The thick, viscous polymer was then cooled and ground. The inherent viscosity of the polymer was 0.78 at a concentration of 0.5% w/v in 60:40 w/w phenol:-tetrachloroethane at 25° C.

EXAMPLE 2

1.2:2:0.8 Polymer Preparation

The preparation was similar to the 1:2:1 preparation except that 139.2 g (1.2 mole) of HMDA in 141 g of DMAC was added to the TMA and the diacetyldiamine was prepared from 208.8 g (1.8 mole) of HMDA and 367.2 g (3.6 mole) of acetic anhydride.

EXAMPLE 3

1.1:2:0.9 Polymer Preparation

The preparation was similar to the 1:2:1 preparation except that 156.6 g (1.35 mole) of HMDA in 158 g of DMAC was added to the TMA and the diacetyldiamine was prepared from 191.4 g (1.65 mole) of HMDA and 336.6 g (3.3 mole) of acetic anhydride.

EXAMPLE 4

0.9:2:1.1 Polymer Preparation

The preparation was similar to the 1:2:1 preparation except that 191.4 g (1.65 mole) of HMDA in 194 g of DMAC was added to the TMA and the diacetyldiamine was prepared from 156.6 g (1.35 mole) of HMDA and 275.4 g (2.7 mole) of acetic anhydride.

EXAMPLE 5

0.8:2:1.2 Polymer Preparation

The preparation was similar to the 1:2:1 preparation except that 208.8 g (1.8 mole) of HMDA in 211 g of DMAC was added to the TMA and the diacetyldiamine was prepared from 139.2 g (1.2 mole) of HMDA and 244.8 g (2.4 mole) of acetic anhydride.

EXAMPLE 6

Injection Molding

The polymers were blended with fiberglass (600 g polymer and 257 g of PPG 3531), dried overnight at 220° F. under vacuum, and injection molded on an Arburg injection molding machine using a rear zone temperature of 525° F., front zone temperature of 550° F., nozzle temperature of 550° F., and mold temperature of 200° F. Samples of all polymers (which were amorphous) were crystallized by heating in an oven at 350° F. for 15 min.

EXAMPLE 7

Heat Deflection Temperatures

Heat deflection temperatures were determined on $\frac{1}{8}'' \times \frac{1}{2}'' \times 5''$ injection molded, annealed bars according to ASTM method D-648 at 264 psi and the results are listed in Table II.

EXAMPLE 8

Crystalline Melting Points

The crystalline melting points were determined on a DuPont 990 Differential Scanning Calorimeter by heating the ground polymer samples at 20° C./min. to 325° C., cooling at 10° C./min. to room temperature, then heating 20° C./min. to 325° C. The Tm's were determined during the second heating scan and are listed in Table II.

EXAMPLE 9

Crystallization Study

The isothermal crystallization kinetics were monitored using the depolarized light intensity method. Prior to crystallization the samples were melted for 10 minutes on a glass slide at 320° C. under nitrogen. The samples were transferred to a Mettler FP-52 hot stage set at 200° C. The induction time for the onset of crystallization and the time for attaining 50% of final crystallinity were determined and are listed in Table II.

TABLE II

| Ratio of diacetyldiamine: trimellitic anhydride: diamine | 1.2:2:0.8 | 1.1:2:0.9 | 1:2:1 |
|---|---|---|---|
| Inherent Viscosity | 0.71 | 0.73 | 0.78 |
| Deflection Temperature @ 264 psi, °F. 30% Glass-filled ASTM Method D-648 | 412 | 453 | 479 |
| Crystalline Melting Point, °F. | none seen | 482 | 513 |
| Induction Time to Onset of Crystallization @ 200° C., min. | 8.9 | 1.9 | 1.6 |
| Half life of Crystallization @ 200° C., min. | 20.8 | 4.3 | 3.8 |
| Ratio of diacetyldiamine: trimellitic anhydride: diamine | 0.9:2:1.1 | 0.8:2:1.2 | |
| Inherent Viscosity | 0.69 | 0.76 | |
| Deflection Temperature | 442 | 437 | |

TABLE II-continued

| | | |
|---|---|---|
| @ 264 psi, °F. 30% Glass-filled ASTM Method D-648 | | |
| Crystalline Melting Point, °F. | 478 | none seen |
| Induction Time to Onset of Crystallization @ 200° C., min. | 2.7 | 5.8 |
| Half life of Crystallization @ 200° C., min. | 5.9 | 13.4 |

EXAMPLE 10

Preparation of N,N'-diacetyl-1,6-hexanediamine

Acetic anhydride (1,000 g) was placed in a 3 liter round bottom flask, immersed in a water bath, and equipped with magnetic stirrer and addition funnel. 1,6-hexanediamine HMDA (485 g) in 500 ml of chloroform was added dropwise to the stirred acetic anhydride over 55 min. After the addition was complete, the mixture was poured into 3 l of ethyl acetate and allowed to crystallize overnight. The product N,N'-diacetyl-1,6-hexanediamine was filtered off and washed with 1.5 l of ethylacetate. After drying (20 in Hg vacuum, 50° C.), 704 g of product (84%) was obtained, m. pt. 128°–129.5° C.

EXAMPLE 11

Polymer Preparation

Trimellitic anhydride (384.2 g), dimethylacetamide (DMAC) (500 ml), trisnonylphenylphosphite (1 g), and N,N'-diacetyl-1,6-hexanediamine (200 g) were placed in a 2 liter 3-necked flask equipped with addition funnel and nitrogen inlet, metal stirrer and distillation takeoff. The mixture was warmed with stirring, and the system flushed with nitrogen. A solution of 116 g 1,6-hexanediamine in 150 ml DMAC was added over 5 min. The bottom half of the spherical heating mantle surrounding the flask was heated to 600° F. After 30 min., about 500 ml of distillate was collected, and the top half of the mantle was now heated with a Variac set at 50. After 30 min. more, an additional 225 ml of distillate had been collected and a low vacuum (20 in Hg) was drawn on the system. After another 20 minutes, a high vacuum (1 mm Hg) was drawn. Stirring 30 min. under high vacuum produced a viscous polymer melt. The polymer was cooled (it crystallized on cooling) and ground. The inherent viscosity of the polymer was 0.81 at a concentration of 0.5% w/v in 60:40 w/w phenol: tetrachloroethane at 25° C.

EXAMPLE 12

Polymer Preparation

Acetic anhydride (306 g, 3 mole) was placed in a 3 liter 3-necked flask equipped with metal stirrer, addition funnel, nitrogen inlet, and reflux condenser. A solution of 174 g (1.5 mole) of 1,6-hexanediamine (HMDA) in 300 ml of dimethylacetamide (DMAC) was added over 10 min. Trimellitic anhydride (576.3 g) and trisnonylphenylphosphite (1.5 g) were added over 10 minutes. This was followed by the addition of a solution of 174 g of HMDA in 250 ml of DMAC. The mantle temperature was set at 570° F., and a slow distillation of solvent (860 ml) over 3 hours ensued. The polymer melt was stirred 35 min. under low vacuum followed by 40 min. under high (1 mm Hg) vacuum. It was then cooled and ground, during which time it crystallized. The inherent viscosity was 0.70 in 60:40 w/w phenol:tetrachloroethane at 25° C. and at a concentration of 0.5% w/v.

EXAMPLE 13

Polymer Preparation

Trisnonylphenylphosphite (1 g) and 1,6-hexanediamine (HMDA) (174 g, 1.5 mole) were placed into a 3 liter 3-necked flask equipped with metal stirrer, addition funnel with nitrogen inlet, and reflux condenser. The system was flushed with nitrogen and then 160 g (1.57 mole) acetic anhydride was added over 10 min. The nitrogen was turned on, the reflux condenser replaced with a distillation takeoff, and the bottom mantle temperature set at 600° F. After heating one hour under slow nitrogen flow, 30 ml of distillate was collected, and the flask contents were at 540° F. This was cooled to 250° F. and 500 ml dimethylacetamide (DMAC) and 576 g trimellitic anhydride added. To this stirred mixture was slowly added 174 g HMDA in 250 ml DMAC. Heating again was started (600° F.), and after 70 min., 790 ml of distillate was collected. A low vacuum (20 in Hg) was drawn on the system, and another 170 ml was collected over 40 min. Stirring under high vacuum 30 minutes yielded crystalline polymer after cooling and grinding with an inherent viscosity of 0.64 (0.5% w/v) in 60:40 w/w phenol:tetrachloroethane.

EXAMPLE 14

Solid State Polymerization

A sample of polymer prepared according to the procedure described in Example 12 was heated to 250° C. under high vacuum for 16 hr. The inherent viscosity of the polymer increased from 0.89 to 1.30 (0.5% w/v) in 60:40 w/w phenol:tetrachloroethane.

EXAMPLE 15

The polymer from Example 11 (487 g) was blended with fiberglass (PPG 3531, 209 g) and Irganox 1098 (3.5 g). This blend was injection molded on an Arburg injection molding machine using a melt temperature of 550° F. Samples of the molded polymer (which was amorphous) were crystallized at 370°F. Results of the mechanical property tests and thermal aging tests are shown in Tables III and IV.

TABLE III

Mechanical Properties of 30% Fiberglass Filled Ordered Poly(hexamethylenetrimellitamide-imide)

| | ASTM Method | Amorphous | Crystalline |
|---|---|---|---|
| Tensile strength, psi | D-638 | 25,300 | 25,500 |
| Tensile modulus, psi | D-638 | 790,000 | 875,000 |
| Elongation at break, % | D-638 | 5.5 | 4.4 |
| Flexural stength, psi | D-790 | 34,000 | 34,800 |
| Flexural modulus, psi | D-790 | 1,086,000 | 1,230,000 |
| Tensile impact strength ft. lb./in.$^2$ | D-1822 | 69.5 | 40.7 |
| H.D.T. @ 264 psi °F. | D-648 | (230) | 447 |

TABLE IV

Thermal Aging @ 400° F. of Crystalline, 30% Glass Filled Poly(hexamethylenetrimellitamide-imide) (A)

| Ultimate Tensile Strength, psi | ASTM Method | Control | 100 hr. | 500 hr. | 1,000 hr. |
|---|---|---|---|---|---|
| | D-638 | | | | |
| A Nylon 66 | | 25,500 | 19,000 | 17,600 | 15,600 |

TABLE IV-continued

Thermal Aging @ 400° F. of Crystalline, 30% Glass Filled Poly(hexamethylenetrimellitamide-imide) (A)

| Ultimate Tensile Strength, psi | ASTM Method | Control | 100 hr. | 500 hr. | 1,000 hr. |
|---|---|---|---|---|---|
| (33% glass) | | 25,000 | 28,000 | 21,400 | 12,900 |
| % Elongation | | | | | |
| A | | 4.4 | 2.8 | 2.8 | 2.1 |
| Nylon 66 | | 5.3 | 4.4 | 2.6 | 1.6 |
| Tensile Impact, ft. lb./in.$^2$ | D-1822 | | | | |
| A | | 40.7 | 20.1 | 21.5 | 13.5 |
| Nylon 66 | | 67 | 27 | 13 | 7 |

EXAMPLE 16

Use of Nucleating Agent

One hundred gram samples of the polymer prepared according to the process of Example No. 12 ($n_{inh}=0.70$ dl/g) were mixed (0.4%) with various possible nucleating agents. These samples were then extruded through a Brabender extruder. The extruded polymer samples were ground and submitted for differential scanning calorimetry runs. They showed that after first melting by heating the ground samples at 20° C./min. to 325° C. and then cooling at 10° C./min., the crystallization temperature (Tc) for the sample containing 0.4 weight percent talc was 223° C. while for the control it was 199° C. A sample of polymer containing 0.4% talc which showed rapid crystallization was submitted for the determination of the isothermal crystallization kinetics via the depolarized light intensity method. The nucleation by talc lowers the induction period for the onset of crystallization for this sample from 27 sec. for the virgin polymer to 3 sec. It also lowers the half life of crystallization from 90 sec. to 30 sec. at 200° C.

EXAMPLE 17

Use of Nucleating Agent

Seven hundred grams of polymer prepared according to the process of Example No. 12 ($n_{inh}=0.67$) was mixed with 300 g of fiberglass (PPG 3531) and 4 g of talc (Steawhite 200) by mixing the ingredients in a jar. A second sample containing the same amount of polymer and fiberglass, and 40 g of talc (Steawhite 200) was also prepared. The samples were injection molded on a Arburg machine using cycle times of 35 and 33 sec., and mold temperatures of 350° and 365° F. respectively. Properties of the resulting specimens, which were crystalline, are listed in the following table.

TABLE V

Physical Properties of Fiberglass Filled Injection Molded Amide-Imide Polymer

| | ASTM Method | | |
|---|---|---|---|
| Mold Temp., °F. | | 350 | 365 |
| Talc | | 0.4 | 4% |
| Tensile Strength, psi | D-638 | 21,500 | 22,800 |
| Tensile Modulus, psi | D-638 | 835,000 | 980,000 |
| % Elongation | D-638 | 3.2 | 3.4 |
| Flexural Strength, psi | D-790 | 32,500 | 34,100 |
| Flexural Modulus, psi | D-790 | 1,430,000 | 1,460,000 |
| Tensile Impact, ft. lb./in.$^2$ | D-1822 | 37.8 | 24.8 |
| Izod ft. lb./in. notch | D-256 | N.A. | 1.26 |
| H.D.T. @ 264 psi, °F. | D-648 | 460 | 485 |

EXAMPLE 18

Fiber Preparation

Multifilament yarns were prepared from polymer prepared according to Example 12 using a spinneret having 7 orifices, each 12 mil in diameter and 24 mil in length (2:1 L/D ratio). The resin was spun at 0.5 cc/min and the yarn was taken up at 60 ft/min. Spinning was successful both at 300° C. and at 305° C. Samples of the yarns extruded at 300° C. and 305° C. were oriented on a draw winder. The principal parts of the draw winder are a driven feed roll, a heated platen over which the fiber is passed onto a faster driven take up roll, and a constant tension winder. Both yarns were oriented at 160° C. at draw ratios of 4.0 X and 4.5 X. The denier, tenacity, initial modulus, elongation at break, knot strength, loop strength, and tensile factor were determined by individual filament breaks, for each of the oriented yarns, after they had been conditions 24 hr at 73° F. and 65% RH. The results are given in Table VI.

TABLE VI

Tensile Properties[1] of Oriented Yarns

| Sample | A | B | C | D |
|---|---|---|---|---|
| Spinning temperature, °C. | 300 | 300 | 305 | 305 |
| Draw Ratio[2] | 4.0 | 4.5 | 4.0 | 4.5 |
| Individual fiber denier | 8.0 | 8.4 | 8.1 | 9.4 |
| Tenacity, g/d | 5.3 | 4.9 | 3.9 | 4.2 |
| Initial modulus, g/d | 94 | 91 | 66 | 74 |
| Elongation at break, % | 15 | 9 | 20 | 13 |
| Knot strength, g/d | 3.3 | 4.1 | 3.8 | 2.9 |
| Loop strength, g/d | 2.4 | 2.3 | 2.8 | 1.7 |

[1] Average of 5 specimens
[2] All samples oriented at 160° C.

EXAMPLE 19

General Method of Polymer Preparation

To the diamine in a 3-necked flask equipped as in prior examples is added two equivalents of acetic anhydride to prepare the diacetyl diamine. To this is then added the trimellitic anhydride and additional solvent (e.g., acetic acid). This is then followed by the addition of a second diamine. The molar ratio of diacetyldiamine:trimellitic anhydride:diamine is 1:2:1. Melt polymerization is then run as in prior examples.

TABLE VII

Further Examples Showing Versatility of the Novel Process

| Example No. | Unacylated Diamine | Diacylated Diamine of |
|---|---|---|
| 20 | 1,6-diaminohexane | 1,6-diaminohexane |
| 21 | 1,2-diaminoethane | 1,12-diaminododecane |
| 22 | 1,8-diaminooctane | 1,4-diaminobutane |
| 23 | 1,4-diaminobutane | 1,8-diaminooctane |
| 24 | 1,12-diaminododecane | 1,6-diaminohexane |
| 25 | 1,6-diaminohexane | 1,12-diaminododecane |
| 26 | 1,10-diaminodecane | 1,6-diaminohexane |
| 27 | 1,8-diaminooctane | 1,6-diaminohexane |
| 28 | 1,6-diaminohexane | 1,8-diaminooctane |
| 29 | 1,12-diaminododecane | 1,8-diaminooctane |
| 30 | 1,10-diaminodecane | 1,10-diaminodecane |
| 31 | 1,6-diaminohexane | 1,10-diaminodecane |
| 32 | 1,8-diaminooctane | 1,10-diaminodecane |
| 33 | 1,10-diaminodecane | 1,8-diaminooctane |
| 34 | 1,9-diaminononane | 1,6-diaminohexane |
| 35 | 1,4-diaminobutane | 1,10-diaminodecane |
| 36 | 1,10-diaminodecane | 1,4-diaminobutane |
| 37 | 1,12-diaminododecane | 1,4-diaminobutane |
| 38 | 1,4-diaminobutane | 1,12-diaminododecane |
| 39 | 1,12-diaminododecane | 1,12-diaminododecane |
| 40 | 1,4-diaminobutane | 1,6-diaminohexane |

TABLE VII-continued

Further Examples Showing Versatility of the Novel Process

| Example No. | 41 1,6-diaminohexane Glass Transition[x] Temperature °C. | 1,4-diaminobutane Crystalline[x] Melting Point °C. | Method of Preparation According to |
|---|---|---|---|
| 20 | 113 | 268 | Example 1 |
| 21 | 126 | 280 | Example 1 |
| 22 | 113 | 271 | Example 1 |
| 23 | 121 | 261 | Example 1 |
| 24 | 82 | 224 | Example 1 |
| 25 | 88 | 223 | Example 1 |
| 26 | 92 | 235 | Example 19 |
| 27 | 98 | 246 | Example 19 |
| 28 | 103 | 238 | Example 19 |
| 29 | 76 | 211 | Example 19 |
| 30 | 77 | 209 | Example 19 |
| 31 | 96 | 224 | Example 19 |
| 32 | 85 | 217 | Example 19 |
| 33 | 80 | 199 | Example 19 |
| 34 | 94 | 218 | Example 19 |
| 35 | 111 | 250 | Example 19 |
| 36 | 102 | 257 | Example 19 |
| 37 | 94 | 237 | Example 19 |
| 38 | 101 | 221 | Example 19 |
| 39 | 62 | 206 | Example 1 |
| 40 | 134 | 286 | Example 1 |
| 41 | 128 | 287 | Example 1 |

[x]The crystalline melting point and glass transition temperatures were determined according to the procedures of Example 8.

EXAMPLE 42

The polyamide-imide of Example 41 was injection molded reinforced with 30% of fiber glass grade PPG 3531. The crystalline parts were obtained by annealing the amorphous parts by placing them in an oven at 300° F. and increasing the temperature to 400° F. over a period of 15 to 20 minutes.

TABLE VIII

|  | Amorphous | Crystalline | ASTM Method |
|---|---|---|---|
| Tensile Strength, psi | 29,500 | 26,300 | D-638 |
| Elongation at Break, % | 5.0 | 4.0 | D-638 |
| Flexural Strength, psi | 41,600 | 33,700 | D-790 |
| Flexural Modulus, psi | 1,330,00 1,360,000 |  | D-790 |
| Izod, foot lb./inch of notch | 2.3 | — | D-256 |
| Tensile Impact, ft./lbs. per square inch | 164 | 91.5 | D-1822 |
| Heat Deflection Temperature @ 264 psi | 257° F. | 512° F. | D-648 |

We claim:
1. A process for the preparation of ordered linear injection moldable polyamide-imide polymers which process comprises reacting fully acylated aliphatic, cycloaliphatic or araliphatic diamines with tricarboxylic acid anhydrides compounds and aliphatic, cycloaliphatic or araliphatic diamines in a molar ratio of about 1.1:2:0.9 to 0.9:2:1.1 at a temperature of about 100 to 700 Fahrenheit.

2. The process of claim 1 wherein free amine functionality is reacted with the tricarboxylic acid anhydride prior to reaction of the acylated amine functionality.

3. The process of claim 2 wherein the tricarboxylic acid anhydride compound is trimellitic anhydride and the polyamide-imides are crystalline.

4. The process of claim 3 wherein the diacylated diamine is selected from one of the following: N,N'-diacetyl-1,6-hexanediamine, N,N'-diacetyl-1,4-butanediamine, N,N'-diacetyl-1,8-diamineoctane, N,N'-diacetyl-1,10-diaminedecane, N,N'-diacetyl-1,12-diaminedodecane.

5. The process of claim 4 wherein the aliphatic diamine is selected from one of the following: 1,6-diaminohexane, 1,2-diaminoethane, 1,4-diaminobutane, 1,8-diaminooctane, 1,10-diaminodecane, 1,12-diaminododecane.

6. The polymer produced according to claim 1 wherein the polymer is in the form of a molded object.

7. The polymer produced according to claim 1 wherein the polymer is in the form of a fiber.

8. The polymer produced according to claim 5 wherein the polymer is in the form of a molded object.

9. The polymer produced according to claim 5 wherein the polymer is in the form of a fiber.

10. The process of claim 1 wherein talc is added as the nucleating agent in about 0.01 to 10.0 weight percent of the total polymer.

11. The process of claim 3 wherein talc is added in about 0.01 to 10.0 weight percent of the total polymer.

12. The composition of claim 8 wherein the molded object contains from about 20 to about 60 weight percent of glass fibers, glass beads, mineral filler or a mixture thereof.

* * * * *

UNITED STATES PATENT AND TRADEMARK OFFICE
CERTIFICATE OF CORRECTION

PATENT NO. : 4,323,493
DATED : April 6, 1982
INVENTOR(S) : Robert G. Keske, et al It is certified that error appears in the above—identified patent and that said Letters Patent is hereby corrected as shown below:

The term of this patent subsequent to March 23, 1999 has been disclaimed.

Signed and Sealed this

Twentieth Day of July 1982

[SEAL]

Attest:

GERALD J. MOSSINGHOFF

Attesting Officer

Commissioner of Patents and Trademarks